United States Patent [19]

Kita et al.

[11] 4,441,192
[45] Apr. 3, 1984

[54] SIGNAL PROCESSING SYSTEM HAVING IMPULSE RESPONSE DETECTING CIRCUIT

[75] Inventors: Yasuhiro Kita, Hachioji; Nobuo Tsukamoto, Tachikawa; Masahiro Koya, Kodaira; Narimichi Maeda, Tachikawa, all of Japan

[73] Assignee: Hitachi, Ltd., Tokyo, Japan

[21] Appl. No.: 294,229

[22] Filed: Aug. 19, 1981

[30] Foreign Application Priority Data

Aug. 29, 1980 [JP] Japan ................................ 55-118311

[51] Int. Cl.³ ............................................. H04B 3/04
[52] U.S. Cl. .......................................... 375/14; 375/1;
333/18
[58] Field of Search ................ 375/1, 115, 11, 12, 375/13, 14; 370/19, 93, 107; 455/29; 343/5 PN, 100 CL; 333/18; 364/724

[56] References Cited

U.S. PATENT DOCUMENTS

| 3,508,172 | 4/1970 | Kretzmer et al. | 375/14 |
| 3,524,169 | 8/1970 | McAuliffe et al. | 375/14 |
| 3,614,622 | 10/1971 | Holsinger | 375/14 |
| 3,659,229 | 4/1972 | Milton | 375/14 |
| 4,037,159 | 7/1977 | Martin | 375/1 |
| 4,164,628 | 8/1979 | Ward et al. | 370/19 |
| 4,206,320 | 6/1980 | Keasler et al. | 370/19 |
| 4,291,409 | 9/1981 | Weinberg et al. | 375/1 |
| 4,293,953 | 10/1981 | Gutleber | 370/21 |

Primary Examiner—Robert L. Griffin
Assistant Examiner—Stephen Chin
Attorney, Agent, or Firm—Antonelli, Terry & Wands

[57] ABSTRACT

A signal processing system detects the transmission characteristics of a channel thereby to compensate the output waveform of the channel into the most-optimum state. The impulse response of the channel is detected by transmitting a code having a keen autocorrelation from the transmission end and by determining the correlation between the received signal of the code transmitted and the same code of the aforementioned code at a reception end.

2 Claims, 9 Drawing Figures

FIG. 6
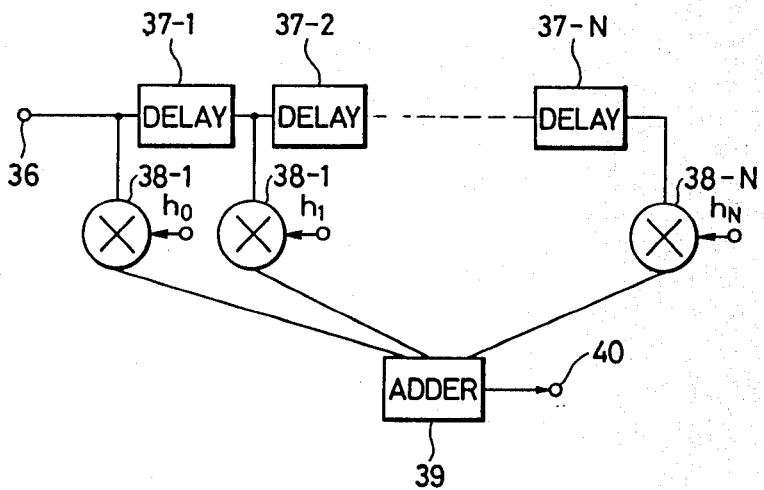
FIG. 7A
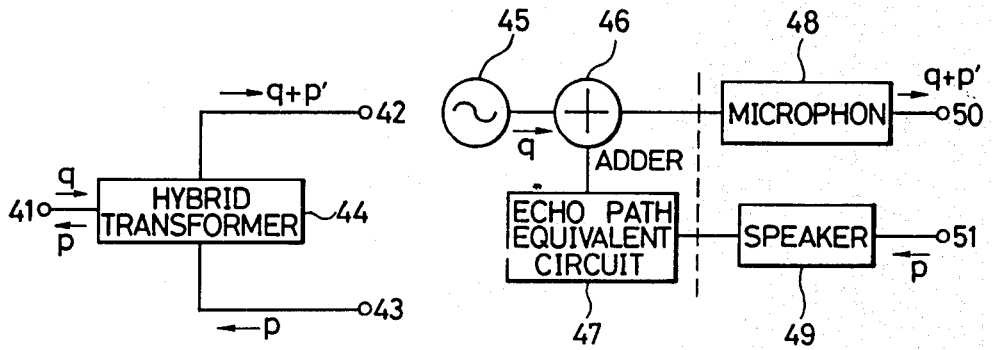
FIG. 7B
FIG. 7C
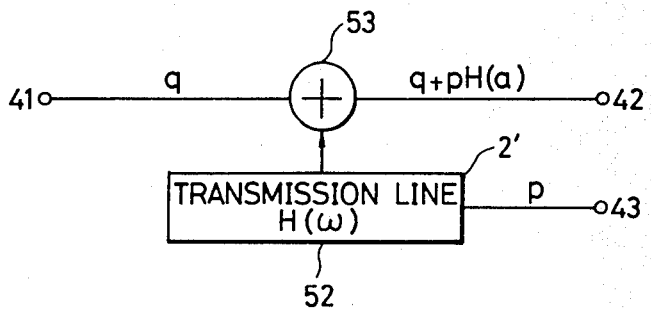

SIGNAL PROCESSING SYSTEM HAVING IMPULSE RESPONSE DETECTING CIRCUIT

FIELD OF THE INVENTION

The present invention relates to a signal processing system, and more particularly to a signal processing system for optimizing the output waveforms of a channel or circuit having transfer characteristics which are unknown or are fluctuating with time.

BACKGROUND OF THE INVENTION

In case an information signal is to be transmitted through a channel, it is practically impossible for the channel to have completely ideal transmission characteristics (or frequency characteristics). In order to compensate the aforementioned transmission characteristics, therefore, the receiving portion is equipped typically with an equalizer, a distortion compensation circuit or the like having inverse characteristics with respect to the aforementioned transmission characteristics of the channel. However, in case the transmission characteristics of the channel either are unknown or fluctuate with time, it is necessary to detect the transmission characteristics and/or to control the aforementioned equalizer, compensation circuit or the like in accordance with those fluctuations.

In order to detect the transmission characteristics of the channel, it is theoretically possible to perform measurements by applying an impulse to the input end of the channel and by observing the waveform of the impulse at the output end. Nevertheless, the realization of such a detecting arrangement as a practical system is difficult.

On the other hand, it has been proposed that the impulse response to the channel be detected to effect the distortion compensation of the signal at the channel in the manner disclosed in Japanese Patent Laid-Open Publication No. 49-25385, which is entitled "Impulse Response Compensating System". According to this proposal, however, the impulse response is determined by consideration of the data transmitted, with the assumption that the transmission data is sufficiently arbitrary, and by taking a correlation with the signal received. Therefore, when it is intended to accurately determine the impulse response, an integral operation over a long period of time is required, which fails to satisfy the requirement for a normal reference (e.g., 160 ms in the case of 9600 bps). However, in shortening the integration time, the accuracy in the impulse response detection is deteriorated. Moreover, a number of integrating circuits are required to carry out this proposal, so that the circuit construction becomes complicated.

SUMMARY OF THE INVENTION

It is, therefore, an object of the present invention to provide a signal processing system in which the impulse response of a channel is detected accurately and promptly so that the transmission waveform is compensated by the use of the detected signal.

In order to attain the aforementioned object, the present invention is characterized by the fact that the impulse response is detected by a code sequence having a keen auto-correlation which is used as a test signal. More specifically, a code sequence having a keen auto-correlation function, such as an orthogonal sequence or a pseudo noise (PN) sequence, is applied to a channel to be measured so that the impulse response signal is detected in terms of the cross correlation between the output signal of the channel and the same code sequence as the aforementioned code sequence, whereby the reception waveform is optimized by the use of that impulse response signal.

The term "channel" as used herein is intended to refer not only to a transmission line, but also generally to a transmission media of any type having predetermined transmission characteristics for converting the input signal into an output signal, such as a circuit, a magnetic tape or a pickup head. The transmission of the test signal includes those cases in which that signal is transmitted for a predetermined test period as well as the case in which the same is transmitted at all times such that it is superposed upon a transmission information signal. On the other hand, the circuit in actual practice may include an analog circuit and a digital circuit.

According to the signal processing system of the present invention, the detection of the impulse response at the reception end of the system is performed by a known code sequence (which is the same as that for the test signal) so that the impulse response can be detected accurately and at a high speed.

Moreover, the signal processing system of the present invention requires less integrators than the aforementioned conventional system, so that its circuit construction can be simplified, as will be described in connection with the following embodiments.

Still moreover, the system of the present invention has an advantage in that the signal-to-noise (S/N) ratio of the output signal is not deteriorated even if the test signal is transmitted while being superposed upon an information signal, and can be applied to the adaptive-equalization of the channel, various kinds of echo cancellations, hand-free telephones or the like.

The aforementioned and other features and objects of the present invention will be more apparent from the following description taken in conjunction with the accompanying drawings.

BRIEF DESCRIPTION OF THE DRAWINGS

FIG. 6 is a schematic circuit diagram showing one embodiment of a transversal filter used in the embodiment of FIG. 5;

FIGS. 7A and 7B are schematic circuit diagrams for explaining the constructions of a hybrid circuit and a wireless telephone, respectively; and FIG. 7C is a diagram showing an equivalent circuit of the circuits of FIGS. 7A and 7B.

DETAILED DESCRIPTION OF THE PREFERRED EMBODIMENTS

Figure 1:
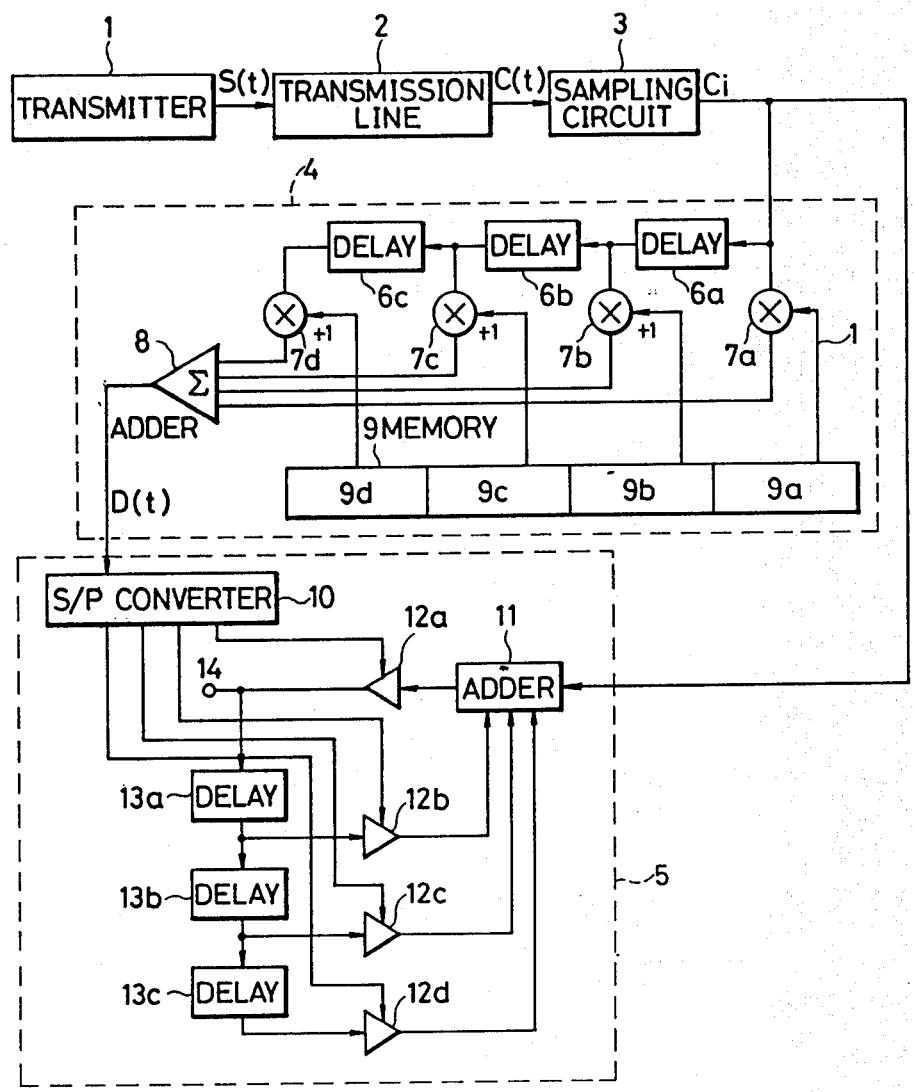
FIG. 1 is a schematic diagram of an embodiment of a signal processing system according to the present invention.

FIG. 1 is a block diagram showing the construction of one embodiment of a signal processing system according to the present invention, in which the waveform of a reception signal is shaped by the use of an automatic equalizer which is adapted for use with a telephone line, a data transmission system or the like.

For simplicity, incidentally, the following description will be made with the assumptions that the signal [+ + + −] of an orthogonal sequence is used as the code sequence forming the test signal having a keen auto-correlation and that the impulse response h(t) of a channel is completely quenched for a four-sample period. Moreover, the system is designed such that the test signal is to be transmitted during an initialization period before the transmission of the information signal. In the data transmission, generally speaking, an initialization period is normally set before the information transmission, and the means to effect such initialization is generally well known in the art, so that its explanation is omitted.

Reference numeral 1 appearing in FIG. 1 indicates a transmitter which includes an information source providing an information signal to be transmitted and a test signal source providing a test signal. From that transmitter, a test signal in the form of an orthogonal sequence signal S(t) [+1, +1, +1, −1] is repeatedly fed out, as shown at S(t) in FIG. 2 (wherein: $a_1$, $a_5$ and so on are level at −1; and $a_2$ to $a_4$, $a_6$ to $a_8$, and so on are at level +1). The pulse frequency of that signal is at about 10 KHz in the case of a voice band signal.

Figure 2:
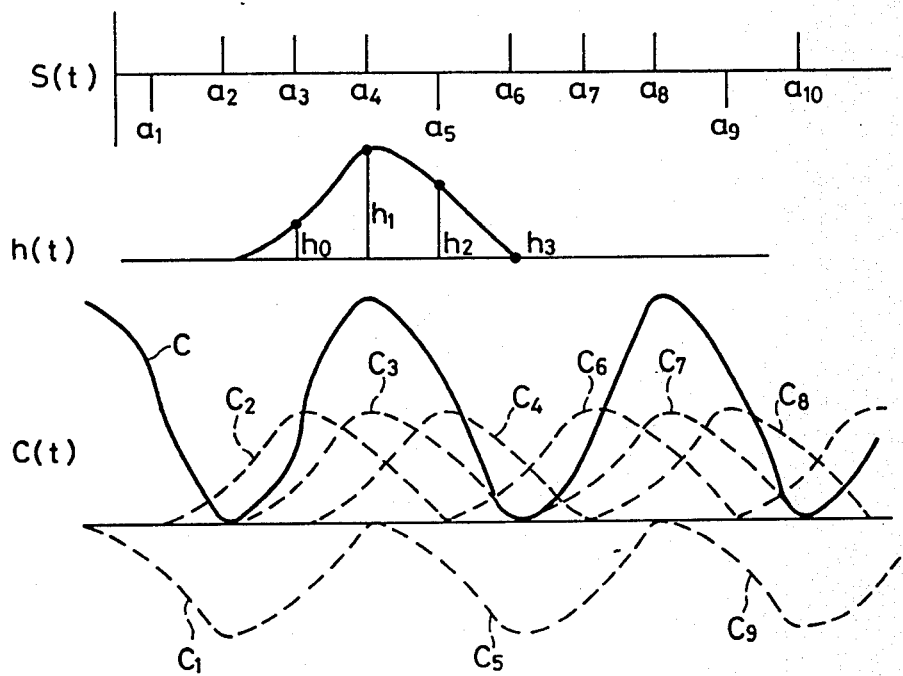
FIG. 2 is a chart showing the signal waveforms for explaining the operations of the embodiment of FIG. 1.

When that code sequence S(t) passes through a transmission line 2, the resultant output signal C(t) has its waveform expressed by the convolution of the impulse response h(t) and the input code sequence S(t) of the transmission line, as shown in FIG. 2C(t). When the transmission line has a transmission characteristic H(ω), more specifically, this characteristic can be expressed by the response waveform when a single isolated pulse is applied to the transmission line, i.e., by the impulse response waveform h(t). This waveform h(t) in FIG. 2 is shown with the assumption that the impulse response waveform of the transmission line 2 is completely quenched for the four-sample period.

Therefore, if the pulses of the code sequence, i.e., the test signal are indicated at $a_1$, $a_2$, $a_3$ and so on, and if the sample values of the impulse response are indicated at $h_0$, $h_1$, $h_2$, $h_3$ and so on, the output signal C(t) is the summation of the impulse response waveform $c_1$, $c_2$, $c_3$ and so on of the respective pulses $a_1$, $a_2$, $a_3$ and so on. That output signal C(t) is converted into a sample signal by the action of a sampling circuit 3. The sampled value of the ith order is expressed by the following equation, if it is indicated at $C_i$:

$$C_i = \sum_{j=0}^{3} h_j a_{i-j} \tag{1}$$

This sample signal is fed to impulse response detecting means 4. Specifically, the sample signal is fed to the series delay eements 6a, 6b and 6c having a delay time equal to one-sample period. The inputs and outputs of the respective delay elements are fed through taps to multipliers 7a, 7b, 7c and 7d and are multiplied by the same codes as the test signals which are stored in memories 9a, 9b, 9c and 9d, i.e., the constants +1, +1, +1 and −1 are stored. If one of those multipliers can invert the sign of the multiplier 7a, the others may be merely amplifiers having a gain 1, in this example. The outputs of the respective multipliers are added by an adder 8. If the multiplier coefficients of the respective multipliers 7a to 7d are denoted at $a_j'$, the output $D_i$ of the adder is expressed by the following equation:

$$D_i = \sum_{j=0}^{3} a_j' c_{1+j} \tag{2}$$

Since the code sequence $a_j$ of the test signals and the multiplier coefficients $a_j'$ of the multipliers are identical, the output $D_i$ of the adder is obtained by substituting the foregoing equation (1) into the equation (2):

$$D_i = \sum_{j=0}^{3} a_j \sum_{k=0}^{3} h_k a_{i+j-k} \tag{3}$$

$$= \sum_{k=0}^{3} h_k \sum_{j=0}^{3} a_j \cdot a_{j+i-k} \tag{4}$$

Here, it is known that the term "$\Sigma a_j a_{j+i-k}$" is an auto-correlation function $\rho_{aa(n)}$ and that the auto-correlation in the case of the aforementioned sequence takes a value of n(=4) for i=k and a value of 0 for i≠k. Hence, the equation (4) is rewritten in the following form:

$$D_i = D_k = 4h_i.$$

This means that the output of the adder 8 is time-sequentially generated from the impulse response waveform.

In the embodiment thus-far described, if the impulse response h(t) takes such values that $h_0=1$, $h_1=3$, $h_2=2$, and $h_3=0$, the following table can be obtained with the outputs of the respective multipliers 5-1, 5-2, − − −, 5-4 being denoted at $T_1$, $T_2$, − − −, $T_4$ and with the output of the adder 8 being denoted at $D_i$:

TABLE

| $T_1$ | 0 | −1 | −3 | −2 | 0 | −1 | −3 | −2 | 0 | − − − |
| $T_2$ | 2 | 0 | 1 | 3 | 2 | 0 | 1 | 3 | 2 | − − − |
| $T_3$ | 3 | 2 | 0 | 1 | 3 | 2 | 0 | 1 | 3 | − − − |
| $T_4$ | 1 | 3 | 2 | 0 | 1 | 3 | 2 | 0 | 1 | − − − |
| $D_i$ | 6 | 4 | 0 | 2 | 6 | 4 | 0 | 2 | 6 | 4 − |

It is understood from the above table that the output $D_i$ repeatedly establishes the impulse responses.

The impulse response signals thus obtained are fed to means for optimizing the transmission waveform of the transmission line 2, i.e., an automatic equalizer 5. The aforementioned impulse response signals $D_i$ are fed to a serial-to-parallel converter (i.e., S/P converter) 10, and the signals indicating the impulse responses $h_0$, $h_1$, $h_2$ and $h_3$ are fed out in parallel to multipliers 12a, 12b, 12c and 12d, respectively. The output of the multiplier 12a is fed through delay means 13a, 13b and 13c having the same delay periods as the aforementioned sample periods to the aforementioned multipliers 12b, 12c and 12d, respectively, the outputs of which are added to the input signal C(i) by the action of an adder 11. The construction and operation of that automatic equalizer thus-far described are similar to those of the known one. If the transmission characteristics, input and output of the transmission line 2 are denoted at H(z), X(z) and Y(z), respectively, the following equation holds:

$$H(z) = \frac{Y(z)}{X(z)},$$

wherein:

$$Y(z) = (h_0 + h_1 Z^{-1} + h_2 Z^{-2} + \cdots + h_n Z^{-N})X(z)$$

(which is the Z-transformation of
$Y(n) = h_0 X(n) + h_1 X(n-1) + h_2 X(n-2) + \cdots - h_N X(n-N)$).

The automatic equalizer 5 is sufficient to realize the inverse characteristics $H^{-1}(z)$ of the aforementioned transmission characteristics $H(z)$. In other words, if a relationship $H_{-1}(z) \cdot Y(z) = X(z)$ holds, there can be attained from the output terminal 14 of the automatic equalizer 5 the original signal of $h_0 X(z)$, i.e., the signals which have their waveforms optimized.

For simplicity of explanation, the embodiment thusfar described with reference to FIG. 1 is directed to the case in which the codes of the orthogonal sequence $[+1, +1, +1, -1]$ are used as the test signals. However, a pseudo noise sequence of the type which is well known in the art also may be employed as the test signals.

Figure 3:
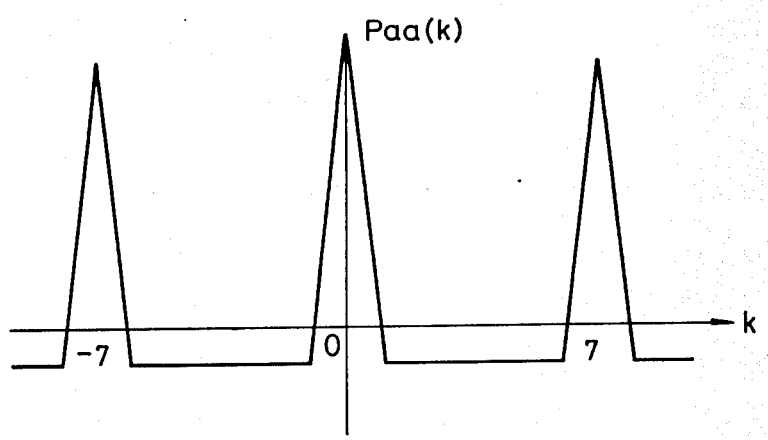
FIG. 3 is a chart showing the auto-correlation of a pseudo noise code to be used in the embodiment of FIG. 4.

FIG. 3 illustrates the auto-correlation coefficient $\rho_{aa}(k)$ in the case where the codes $[- + + - + - -]$ are used as the pseudo noise sequence codes. If the number of the constituting bits is denoted by n, the auto-correlation coefficient $\rho_{aa}(k)$ is expressed by the following relationships:

$$\rho_{aa}(k) \begin{cases} 1 : k = 0 \\ -\frac{1}{n} : 0 < k < n \end{cases}$$

The construction of the signal processing system using these pseudo noise sequence codes as the test signals according to the present invention is substantially the same as that in the case where the orthogonal sequence codes are used. If the description is made upon the foregoing embodiment of FIG. 1, it is sufficient that the tap multipliers 7 and 12 and the tap coefficient memories 9 of both the impulse response detector 4 and the automatic equalizer be present in accordance with the number of the code constituting bits.

On the other hand, although it is not considered as to the foregoing embodiment that a noise signal $W_i$ is fed between the transmission line 2 and the impulse response detector 4, the signal processing system according to the present invention can enjoy the following effects when the noise signal $W_i$ is taken into consideration.

By an analysis similar to the aforementioned one based on equations (1) to (4), the output $D_i$ of the impulse response detector 4 is expressed by the following equation:

$$D_i = (n+1)h_i - \sum_{j=0}^{m-1} h_j + \sum_{j=0}^{n-1} a_i W_i \quad (5)$$

Here letter n denotes the length of the code sequence of the test signals (which corresponds to the bit number and the tap number of the circuit); and letter m denotes the length of the impulse response (which corresponds to N of the impulse responses $h_0, h_1, \cdots, h_N$).

From the above equation (5):

(i) The term "$\Sigma h_j$" is a term which has no relationship with i and appears as a d.c. component in the output of the detector. Hence, that term usually exerts no influence upon the measurement accuracy of the impulse response.

(ii) Since the impulse response $h_i$ is multiplied by $(n-1)$ and since the noise is an addition of an n number of independent noises, the ratio of the detected signal to the noise is improved $\sqrt{n}$ times if the number n is increased.

It is therefore, understood that the impulse response can be completely obtained even if the usual pseudo noise codes are used and that the S/N ratio can be improved to a desired level by increasing the number n.

Figure 4:
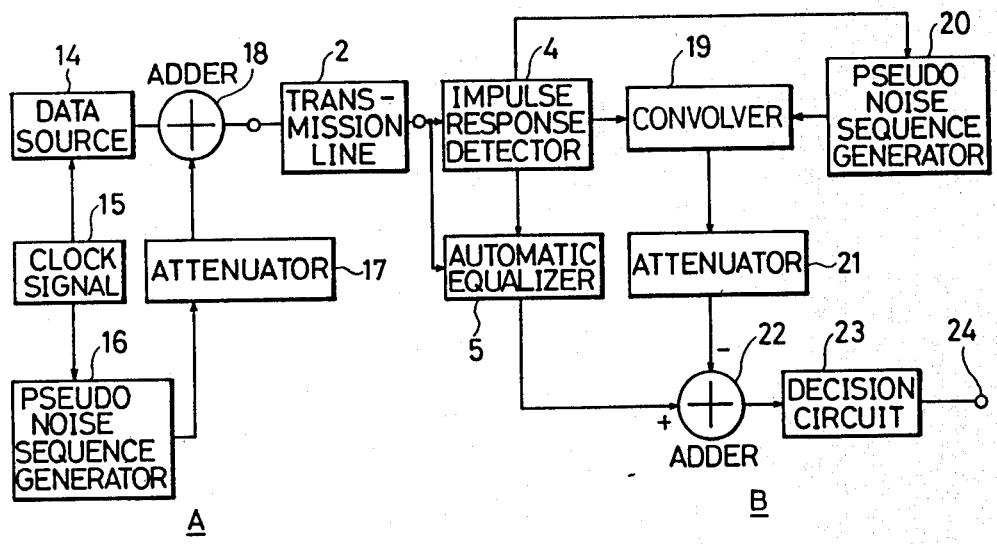
FIG. 4 is a schematic diagram of another embodiment of a signal processing system according to the present invention.

FIG. 4 is a diagram showing the construction of another embodiment of the signal processing system according to the present invention, in which the pseudo noise codes used as the test signals are fed out not during the test period, but at all times while being superposed upon the data signal (or the information signal) to be transmitted.

At the transmission end A, the code signal from a pseudo noise sequence generator 16 is attenuated at a predetermined ratio by an attenuator 17 and is added to the data signal from a data source (or information source) 14 and the result is transmitted through the transmission line 2 to the reception end B. Incidentally, a clock signal source 15 is provided for driving the data source 14 and pseudo noise sequence generator 16.

At the reception end B, the reception signal is processed by the impulse response detector 4 and the automatic equalizer 5 which have similar constructions to those of the embodiment of FIG. 1. Since, in the present embodiment, the test signals are superposed upon the data signal, the output of the automatic equalizer 5 still contains the test signal. In order to eliminate only that test signal so that the signal waveform may be optimized, only the data signal can be extracted by preparing the same signal as the test signal of the reception signal and by subtracting the prepared signal from the reception signal. More specifically, there is provided a pseudo noise code sequence generator 20 which is operative to generate the same pseudo noise code as the test signals at the transmission end so that the impulse response signal detected by the impulse response detector 4 and the convolution of the above generator 20 are generated by a convolver 19. The output of this convolver 19 is fed through an attenuator 21 to an adder 22 (in which subtraction is performed because the addition is made in a manner to have the signs inverted) so that it may have the same amplitude as that of the test signals which have been attenuated by the channel. The output signal of the adder 22 is fed through the same data decision circuit 23 as the conventional one so that the data signals are fed out of an output terminal 24. According to the present embodiment, in spite of no special test period, the superposed test signals can be filtered out without having the intrinsic data signals influenced.

Figure 5:
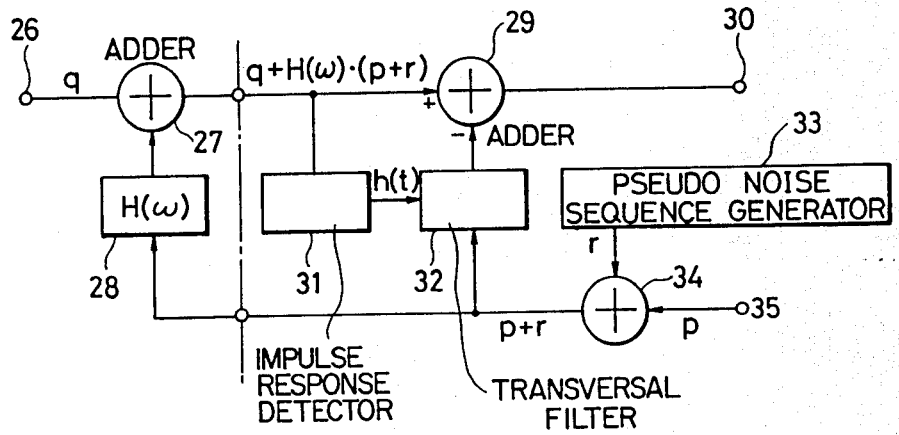
FIG. 5 is a schematic diagram of still another embodiment of a signal processing system according to the present invention.

FIG. 5 shows the construction of still another embodiment of the sign processing system according to the present invention. Especially, the present embodiment is applied to either a hybrid circuit for coupling the two-wire line of a bi-directional transmission line and the four-wire line of a uni-directional transmission line of a telephone line or a hand-free telephone, i.e., a wireless telephone requiring no press talk.

In the hybrid circuit, as shown in FIG. 7A, the input signal p received at a four-wire input terminal 43 is fed through a hybrid transformer 44 to a two-wire line. On the other hand, the signal q from the input terminal 41 of the two-wire line is fed through the hybrid transformer 44 to a four-wire output line. However, when a sufficient matching is not effected between the hybrid transformer 44 and the two-wire line, a portion p' of the input signal p leaks into the four-wire output line so that the signal of the four-wire output line becomes q+p', thus causing the echoing and singing phenomena.

In the wireless telephone or the like, on the other hand, without the press talk feature, the aural signal p which has passed through a reception terminal 51 and a speaker 49 partially leaks into the line of an aural signal source 45 of a speaker and a microphone 48, as shown in FIG. 7B, so that the signal from the output terminal 50 of the microphone 48 becomes the superposition q+p' of the signal q of the speaker and the leak signal p'. This causes the oscillating or singing phenomenon similarly to the hybrid circuit, and actually the press talk for switching the transmission and the reception is performed.

As a result, the signal processing system according to the present invention is applied to those systems so that the echo and leak components can be eliminated. In other words, the circuits shown in FIGS. 7A and 7B can be both expressed by an equivalent circuit such as shown in FIG. 7C. The reception signal input terminal p is added through a transmission line 2' having transmission characteristics $H(\omega)$ to the input signal q from the information source input terminal 41 and through an adder 53 to the information signal q. As a result, there is generated at an output terminal 42 a signal which is expressed by $q+p\cdot H(a)$. The signal processing system according to the present invention is applied to such signal waveform so that the impulse response to the transmission line 2' is detected, whereby the impulse response signal detected is used to optimize the signal waveform.

As shown in the embodiment of FIG. 5, more specifically, the signal from a pseudo noise sequence generator 33 is added to the signal from a reception signal input terminal 35, and the added signal is further added to a transversal filter 32 having variable filtration characteristics. On the other hand, a portion of the signal from the adder 34 leaks or echoes, as has been described with reference to FIGS. 7A and 7B, until it is added to the information signal. Although a transmission line 28 and an adder 27 are equivalently shown in FIG. 5, it is quite natural that a concrete circuit therefore is not actually added. The transmission characteristics $H(\omega)$ of the transmission line 28 are detected from the information signal containing the leak signal by means of such an impulse response detector 31 as has been described in the foregoing embodiments so that the characteristics of the transversal filter 31 are controlled by the signal detected.

FIG. 6 is a circuit diagram showing the construction of one embodiment of the aforementioned filter 32, in which the output signal p+r of the adder 34 is fed to an input terminal 36. This input signal is fed to a circuit (37-1, 37-2, — — —, 37-N) which is composed in cascade connection of delay elements 37 having the same delay time as one of the pseudo noise codes. The respective delay elements have their input and output terminals equipped with taps, the respective outputs of which are fed to multipliers 38-0, 38-1, — — —, 38-N, respectively. These multipliers 38-0, 38-1, — — —, 38-N are fed with the coefficients $h_0, h_1, — — —, h_N$ of the impulse response, respectively, from the impulse response detector 31. The outputs of those respective multipliers are added by means of an adder 39, from the output terminal 40 of which is generated a signal $H(\omega)(p+r)$.

As a result, if the output of that filter 32 having its sign inverted is added to the signal $q+H(\omega)(p+r)$ from the adder 27 by means of an adder 29, only the intrinsic information signal q is generated from an output terminal 30. In other words, the signal waveform is optimized. Thus, the echoing and singing phenomena are eliminated so that the hand-free telephone requiring no press talk feature can be realized as a telephone. On the other hand, there are fed out the signals in which the pseudo noise codes are superposed upon the reception signal. It is possible to detect the impulse response in response to such a weak pseudo signal as is free from deterioration of the original signal by selecting or averaging (e.g., averaging many data) of the length of the code sequence on the basis of the aforementioned principle.

Although the foregoing description has been made with reference to the embodiments of the signal processing system according to the present invention, the present invention should not be limited to the aforementioned embodiments but can take a variety of modes. For example, the following modes are included in the scope of the present invention.

(i) Optimization of Frequency Characteristics of (Magnetic) Recording System:

The transmission characteristics of a head or a detecting system are measured so that the impulse response can be preset as to adapt for the recording system (for modulation of decision).

(ii) Impulse Response Measuring Equipment:

A measuring equipment for displaying the impulse response characteristics of a system to be measured. The quantity, which has been determined according to the prior art by measuring the frequency characteristics (i.e., the amplitude and phase characteristics) and by calculating the measured characteristics, can be directly measured. These is provided an equipment which is effective for development of a transmission device (e.g., a tester).

(iii) Ghost Canceller of TV:

It is possible by the application of a process B to effect the broadcast while a weak PN sequence is superposed upon the broadcast waves and to measure the impulse response at the reception end thereby to cancel the echo (or ghost).

What is claimed is:

1. A signal processing system comprising:
code sequence generating means for generating a selected code sequence including a plurality of coefficients and having a discernible auto-correlation characteristic;
transmission means connected to the output of said generating means for transmitting signals, including said selected code sequence, including a hybrid circuit for coupling a two-wire line to a four-wire output line and for coupling a four-wire input line to said two-wire line, said code sequence generating means being coupled to said four-wire input line;

impulse response detecting means coupled to said four-wire output line for determining the impulse response of said transmission means by detecting the correlation between the output signal of said transmission means and said selected code sequence, including delay means having a plurality of taps at which are fed out a plurality of continuous sample values of said selected code sequence received from said transmission means, means for producing the coefficients of said selected code sequence, a plurality of multipliers connected to said plural taps of said delay means for effecting multiplications of said sample values by the produced coefficients of said code sequence, and means for adding the outputs of said multipliers; and means coupled to said transmission means for optimizing the transmission waveform of the signals transmitted by said transmission means in response to the output of said impulse response detecting means, including a transversal filter connected to be driven by the output of said impulse response detecting means and to be receptive of the signal of said four-wire input line and means for subtracting the output of said filter from the signal of said four-wire output line.

2. A signal processing system comprising:

code sequence generating means for generating a selected code sequence including a plurality of coefficients and having a discernible auto-correlation characteristic;

transmission means connected to the output of said code sequence generating means for transmission signals, including said selected code sequence, comprising means forming a path for making an aural sound echo to a microphone from a speaker, wherein the code sequence generating means includes first means for converting a code sequence signal into an aural sound;

impulse response detecting means disposed in the vicinity of said microphone for determining the impulse response of said transmission means by detecting the correlation between the output signal of said transmission means and said selected code sequence, including second converting means for converting said aural sound into an electrical signal thereby to detect said code sequence, delay means having a plurality of taps at which are fed out a plurality of continuous samples values of said selected code sequence received from said second converting means, means for producing the coefficients of said selected code sequence, a plurality of multipliers connected to said plural taps of said delay means for effecting multiplications of said sample values by the produced coefficients of said code sequence, and means for adding the outputs of said multipliers; and means coupled to said transmission means for optimizing the transmission waveform of the signals transmitted by said transmission means in response to the output of said impulse response detecting means including a transversal filter driven by said impulse response detecting means and connected to receive said code sequence and means for subtracting said filter output from said microphone output signal.

* * * * *